United States Patent [19]

Kent et al.

[11] Patent Number: 4,585,630
[45] Date of Patent: Apr. 29, 1986

[54] PROCESS FOR SELECTIVELY REMOVING HYDROGEN SULFIDE

[75] Inventors: Van A. Kent, Lake Jackson; Roberto A. Abib, Clute; Larry H. Kirby, Lake Jackson, all of Tex.

[73] Assignee: The Dow Chemical Company, Midland, Mich.

[21] Appl. No.: 710,722

[22] Filed: Mar. 11, 1985

[51] Int. Cl.$^4$ ............................................. C01B 17/05
[52] U.S. Cl. ..................................... 423/234; 423/220
[58] Field of Search ................................ 423/220, 234

[56] References Cited

U.S. PATENT DOCUMENTS

| | | | |
|---|---|---|---|
| 2,477,314 | 7/1949 | Scharmann | 423/220 |
| 2,662,000 | 12/1953 | Maschwitz | 423/561 R |
| 2,747,962 | 5/1956 | Heitz et al. | 423/236 |
| 2,761,755 | 9/1956 | Brown | 423/220 |
| 2,878,099 | 3/1959 | Breuing et al. | 423/233 |
| 3,556,721 | 1/1971 | Radusch | 423/234 |
| 4,113,837 | 9/1978 | Kendall et al. | 423/234 |
| 4,336,233 | 6/1982 | Appl et al. | 423/234 |
| 4,395,385 | 7/1983 | Welsh | 423/234 |
| 4,477,420 | 10/1984 | Bauer et al. | 423/234 |

OTHER PUBLICATIONS

Hohlfield, "Selective Adsorption of H$_2$S from Sour Gas", *J. Petr. Tech.*, Jun. 1980, pp. 1083–1089.

*Primary Examiner*—John Doll
*Assistant Examiner*—Lance Johnson
*Attorney, Agent, or Firm*—Benjamin G. Colley

[57] ABSTRACT

Hydrogen sulfide is removed from gas streams containing it with or without carbon dioxide by contacting the gas feed stream with an aqueous liquid containing sulfide and bisulfide ions and having a pH in the range from 9 to 12 to remove a minor portion of the hydrogen sulfide and then removing the remainder with an aqueous liquid containing sulfide and bisulfide ions having a higher pH in the range from 11 to 13.5.

8 Claims, 1 Drawing Figure

PROCESS FOR SELECTIVELY REMOVING HYDROGEN SULFIDE

BACKGROUND OF THE INVENTION

This invention relates to a process wherein $H_2S$ is selectively removed in a minimum two stages of gas-liquid scrubbing from gas streams containing $H_2S$ and $CO_2$ with little or no $CO_2$ removal.

The selective removal of $H_2S$ from $CO_2$ in gases containing them and the use of alkaline salt solutions for $H_2S$ and $CO_2$ adsorption is generally known from "Gas Purification" by Kohl and Riesenfeld Third Edition (1979) Chapters 4 and 5.

The removal of $H_2S$ gas from refinery gas streams by contacting the gas stream with basic alkali metal sulfide solutions in a single contactor is known from U.S. Pat. No. 2,662,000. However, the use of this technology with a gas stream containing both $H_2S$ and $CO_2$ gases results in the precipitation of insoluble sodium carbonate and the fouling of the equipment and inefficient use of alkalinity.

SUMMARY OF THE INVENTION

The present invention is directed to a process for selectively removing hydrogen sulfide ($H_2S$) from a sour gas stream containing $H_2S$ with or without carbon dioxide ($CO_2$).

The process of the invention has the following steps:
(A) contacting said sour gas stream with a first aqueous solution of a mixture of sulfides and bisulfides having a cation selected from the group consisting of alkali metal ions, alkaline earth ions, ammonium ions, and mixtures thereof and having a pH in the range from about 9 to about 12 whereby a minor amount of said $H_2S$ is removed, a gas stream of lowered $H_2S$ content is generated, and a solution having an excess of bisulfide ions is generated,
(B) removing a portion of said generated solution as needed,
(C) separating said generated gas stream,
(D) contacting said generated gas stream with a second aqueous solution of a mixture of an alkali metal sulfide and an alkali metal bisulfide having a pH maintained in the range from about 11.0 to about 13.5 and is at least one unit higher than said first pH range, whereby a substantially purified gas stream is generated, and said first solution is generated,
(E) separating said purified gas stream from said first solution, and
(F) continuously recycling said first solution to said first contacting step.

It is to be understood that the first stage of the process i.e. the contacting of the gaseous feed stream with an aqueous solution of sulfide and bisulfides can also be called a bisulfide generation step. The second step of the process i.e. the contacting of the gas stream having a lowered $H_2S$ content can be called a scrubbing step since a large amount and/or the remainder of the $H_2S$ is removed in the scrubbing step. It is contemplated that if further removal of $H_2S$ is desired, one can use a generation step followed by two scrubbing steps in series. Alternatively, one can use two generation steps followed by one scrubbing step all in series.

Figure 1:
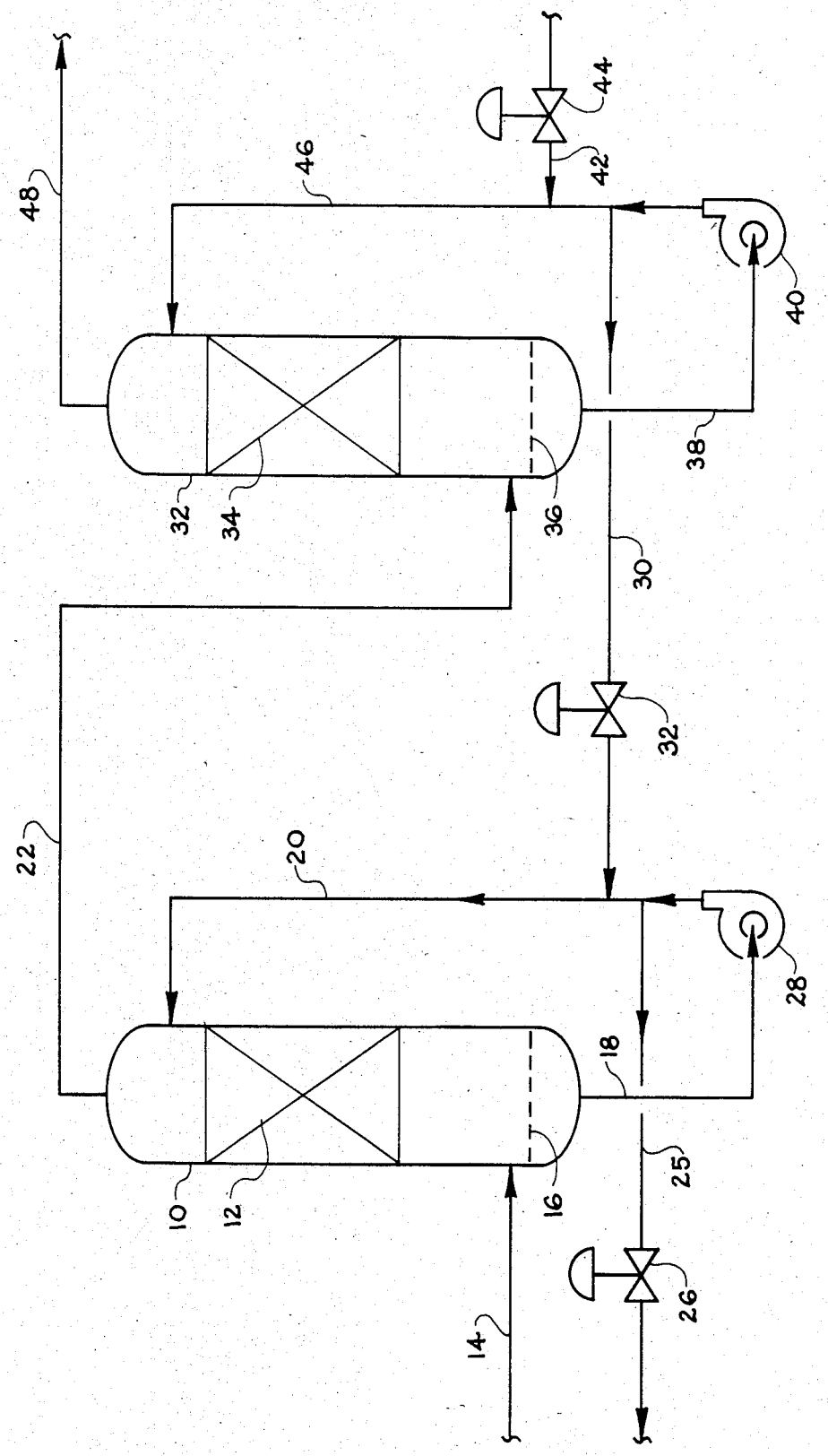
FIG. 1 illustrates a process wherein the invention is applied to a gas stream containing $H_2S$ and $CO_2$ using two contactors having internal packing.

The inlet line 14 allows the feed gas to enter the first contactor 10 at point between the packing material 12 and the liquid level 16.

An aqueous solution of alkali metal, alkaline earth, or ammonium sulfides and bisulfides flows into the contactor 10 at the upper part thereof by means of line 20. This solution flows downwardly through the contact elements or packing material 12 where it is countercurrently contacted by the inlet gases from line 14. A minor amount such as 5 to 20% of $H_2S$ in the gas stream is converted to bisulfide ions by the reaction of the $H_2S$ with the sulfide ions. The liquid level 16 in the bottom of the contactor 10 is maintained at a substantially constant level by a liquid level controller (not shown) which connected to valve 26.

Periodically, a portion of the excess bisulfide solution is withdrawn as a by-product by line 25.

Pump 28 provides a constant recirculation of the sulfide-bisulfide solution back to the contactor 10 by means of line 20.

A partially purified gas stream is removed from the top of contactor 10 by line 22 and this gas stream is fed to the second contactor 32 at a point between the contact elements or packing material 34 and liquid level 36. In the second contactor 32 the gas fed by line 22 is contacted with a sulfide-bisulfide solution having a higher pH than the solution in line 20. This is made possible by the fact that fresh aqueous sodium hydroxide solution having a concentration of up to 40 weight percent sodium hydroxide is added by line 42 with the amount added being controlled by valve 44. Valve 44 is controlled by the pH in either line 30 or line 25.

The fresh sodium hydroxide converts the bisulfide ions to sulfide ions by a well known reaction in line 46. Hence, any carbon dioxide ($CO_2$) gas in the feed stream never contacts sodium hydroxide and no carbonate salts are formed.

Pump 40 is provided to recirculate the bisulfide-sulfide solution back to the contactor 32 and to recirculate to the solution to the first contactor 10 by means of line 30, control valve 32, and line 20.

The purified gas is removed from the top of the contactor 32 by line 48.

DETAILED DESCRIPTION OF THE INVENTION

The process of this invention is useful to treat gas streams containing about 0.001 to about 50 percent by volume $H_2S$ and about 0 to 90 percent by volume $CO_2$.

Typical examples of gas streams that can be treated are fuel gas, synthetic natural gas, natural gas, nitrogen and cracked gas.

The process is conducted at a temperature range from about 5° to 95° C. and preferably in the range from 20° to 40° C.

The pressure range for the contactors is generally from about 1 to 70 atmospheres and preferably 2 to 10 atmospheres.

The contactors for the gas-liquid contact can be the conventional internal packing types such as, Pall rings, Beryl saddles and Raschig rings. Also useful are spray towers, tray towers and inline static mixing elements.

In general, the contact time of the liquid and gas should be in the range from about 0.01 to about 30 seconds and preferably in the range from 0.03 to 1 second.

Detailed examples are given below for the purpose of further illustrating but not limiting the invention.

EXAMPLE 1

A natural gas stream (1200 cubic feet per minute) containing 6000 ppm of $H_2S$ and 5000 ppm $CO_2$ was contacted with a sodium bisulfide-sodium sulfide solution using the process illustrated in the FIGURE of the drawing with static mixers in place of the tower packing. The solution in each contactor was circulated at a rate of 10 gallons per minute.

The pH of the first contactor was maintained at 11.2 and the second contactor was maintained at 13.0 by a constant addition of sodium hydroxide. This resulted in an outlet gas containing a reduced amount of $H_2S$ (400 ppm) and all the original $CO_2$ gas.

EXAMPLES 2-5

The procedure of example 1 was repeated with varying pH values as set forth below in Table I. The controls illustrate the undesired formation of carbonate salts when the pH of the second contactor is not sufficiently high. The controls also indicate low removal of $H_2S$ when the pH's are not in the desired range.

TABLE I

| | Inlet $H_2S$ (ppm) | First Reactor pH | Second Reactor pH | Outlet $H_2S$ (ppm) | Outlet Carbonate (Wt. %) |
|---|---|---|---|---|---|
| Example 2 | 8000 | 11.2 | 12.8 | 600 | 0 |
| Example 3 | 7000 | 10.8 | 13.0 | 400 | 0 |
| Example 4 | 7000 | 11.0 | 12.5 | 700 | 0 |
| Example 5 | 20,000 | 10.6 | 12.5 | 2000 | 0 |
| Control 1 | 21,000 | 10.9 | 10.7 | 11,000 | 0.53 |
| Control 2 | 12,000 | 11.2 | 10.5 | 10,000 | 0.10 |

We claim:

1. A process for selectively removing $H_2S$ from a sour gas feed stream containing $H_2S$ with or without $CO_2$ which comprises the steps of
   (A) contacting said sour gas stream with a first aqueous solution of a mixture of sulfides and bisulfides having a cation selected from the group consisting of alkali metal ions, alkaline earth ions, ammonium ions, and mixtures thereof and having a pH in the range from about 9 to about 12 whereby a minor amount of said $H_2S$ is removed, a gas stream of lowered $H_2S$ content is generated, and a solution having an excess of bisulfide ions is generated,
   (B) removing a portion of said generated solution as needed,
   (C) separating said generated gas stream,
   (D) contacting said generated gas stream with a second aqueous solution of a mixture an alkali metal sulfide and an alkali metal bisulfide having a pH maintained in the range from about 11.0 to about 13.5 and is at least one unit higher than said first pH range
   whereby a substantially purified gas stream is generated, and said first solution is generated,
   (E) separating said purified gas stream from said first solution, and
   (F) continuously recycling said first solution to said first contacting step.

2. The process as set forth in claim 1 wherein the amount of $H_2S$ in said feed stream ranges from about 0.001 to about 50 percent by volume and the amount of $CO_2$ in said feed stream ranges from about 0.0 to about 90 percent by volume.

3. The process of claim 1 wherein steps (A) and (D) are conducted at a temperature range from about 5° to 95° C. using liquid-vapor contactors, and a contact time ranging from 0.01 to 30 seconds.

4. The process of claim 1 wherein step (A) is conducted at a pH range from about 10.5 to 11.0 and step (D) is conducted at a pH range from about 11.5 to 12.0.

5. A process for selectively removing $H_2S$ from a sour gas feed stream containing $H_2S$ which comprises the steps of
   (A) contacting said sour gas stream with a first aqueous solution of a mixture of an alkali metal sulfide and an alkali metal bisulfide having a pH in the range from about 9 to about 12 whereby a minor amount of said $H_2S$ is removed, a gas stream of lowered $H_2S$ content is generated, and an alkali metal solution having an excess of bisulfide ions is generated,
   (B) removing a portion of said generated solution as needed,
   (C) continuously recirculating the remainder of said generated solution to said first aqueous solution,
   (D) separating said generated gas stream,
   (E) contacting said generated gas stream with a second aqueous solution of a mixture of an alkali metal sulfide and an alkali metal bisulfide having a pH maintained in the range from about 11.0 to about 13.5 by the continuous addition of a suitable hydroxide compound where said range is always at least one unit higher than said first pH range and whereby a substantially purified gas stream is generated, and a second solution is generated,
   (F) separating said purified gas stream, from said second solution, and
   (G) continuously recycling said second solution to said first contacting step.

6. The process as set forth in claim 5 wherein the amount of $H_2S$ in said feed stream ranges from about 0.001 to about 50 percent by volume and the amount of $CO_2$ in said feed stream ranges from about 0.0 to about 90 percent by volume.

7. The process of claim 5 wherein steps (A) and (D) are conducted at a temperature range from about 5° to 95° C. using liquid-vapor contactors, and a contact time ranging from 0.01 to 30 seconds.

8. The process of claim 5 wherein step (A) is conducted at a pH range from about 10.5 to 11.0 and step (D) is conducted at a pH range from about 11.5 to 12.0.

* * * * *